United States Patent
Hackel

(10) Patent No.: US 9,409,254 B2
(45) Date of Patent: Aug. 9, 2016

(54) ABLATION LAYERS TO PREVENT PITTING IN LASER PEENING

(75) Inventor: Lloyd A. Hackel, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 2125 days.

(21) Appl. No.: 11/240,676

(22) Filed: Sep. 30, 2005

(65) Prior Publication Data
US 2007/0075062 A1    Apr. 5, 2007

(51) Int. Cl.
*B23K 26/00* (2014.01)
*B23K 26/18* (2006.01)
*C21D 10/00* (2006.01)

(52) U.S. Cl.
CPC ......... *B23K 26/0006* (2013.01); *B23K 26/0081* (2013.01); *B23K 26/18* (2013.01); *C21D 10/005* (2013.01); *B23K 2201/18* (2013.01); *B23K 2201/34* (2013.01); *B23K 2203/08* (2013.01); *B23K 2203/16* (2013.01); *B23K 2203/50* (2015.10)

(58) Field of Classification Search
CPC ........... B23K 2201/18; B23K 2201/34; B23K 2203/08; B23K 2203/16; B23K 2203/50; B23K 26/0006; B23K 26/0081; B23K 26/18; C21D 10/005
USPC ................. 219/121.6–121.86, 128
See application file for complete search history.

(56) References Cited

U.S. PATENT DOCUMENTS

| | | | | |
|---|---|---|---|---|
| 4,401,477 | A | * | 8/1983 | Clauer et al. .................. 148/525 |
| 4,937,421 | A | * | 6/1990 | Ortiz et al. ............... 219/121.68 |
| 5,131,957 | A | | 7/1992 | Epstein et al. |
| 5,674,328 | A | | 10/1997 | Mannava et al. |
| 5,741,559 | A | * | 4/1998 | Dulaney ........................ 427/554 |
| 5,932,120 | A | | 8/1999 | Mannava et al. |
| 6,355,322 | B1 | * | 3/2002 | Golledge ...................... 428/40.1 |
| 6,440,254 | B1 | | 8/2002 | Rich et al. |
| 6,677,037 | B1 | * | 1/2004 | Miller et al. .................. 428/345 |
| 7,115,844 | B2 | * | 10/2006 | Ferguson ...................... 219/549 |
| 7,262,240 | B1 | * | 8/2007 | Breton et al. ................. 524/404 |

FOREIGN PATENT DOCUMENTS

FR    2 714 320 A    6/1995

OTHER PUBLICATIONS

Translation of office action of Japan Patent Office, for the present application, 2008-533740, Jun. 5, 2012, 3 pp.
Translation of office action of Japan Patent Office, 2008-533740, Sep. 25, 2013, 3 pp.

* cited by examiner

*Primary Examiner* — Sang Y Paik
(74) *Attorney, Agent, or Firm* — John P. Wooldridge

(57) ABSTRACT

A hybrid ablation layer that comprises a separate under layer is applied to a material to prevent pitting resulting from laser peening. The underlayer adheres to the surface of the workpiece to be peened and does not have bubbles and voids that exceed an acceptable size. One or more overlayers are placed over and in contact with the underlayer. Any bubbles formed under the over layers are insulated from the surface to be peened. The process significantly reduces the incidence of pits on peened surfaces.

22 Claims, 1 Drawing Sheet

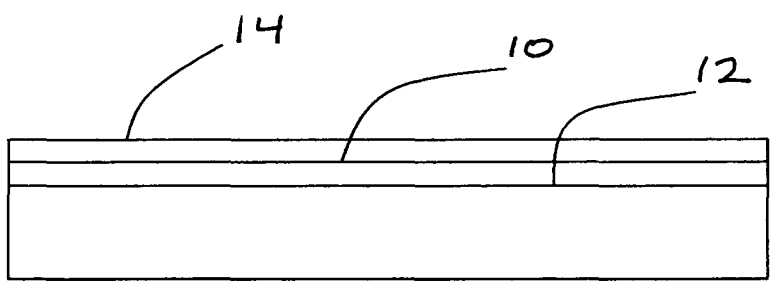

ABLATION LAYERS TO PREVENT PITTING IN LASER PEENING

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates laser peening, and more specifically, it relates to techniques for applying an ablative layer that will not create pitting when performing laser peening.

2. Description of Related Art

The use of an ablation layer in laser peening is well known. See, e.g., U.S. Pat. No. 4,937,421 and C. S. Montross et al., which are briefly discussed below.

In U.S. Pat. No. 4,937,421, titled "Laser peening system and method," a laser peening apparatus and method for peening a workpiece utilizing a laser beam is described. The system includes a foil aligned with a surface of the workpiece to be peened and lasing the aligned foil surface. The foil absorbs energy from the beam and a portion of the foil vaporizes, which creates a hot plasma within the foil. The plasma creates a shock wave which passes through the foil and peens the workpiece surface.

In a paper by C. S. Montross et al., titled: "The Influence of Coating on Subsurface Mechanical Properties of Laser Peened 2011-T3 Aluminum", Journal of Material Science 36 (2001) 1801-1807, an ablative, sacrificial coating such as paint or metal foil is discussed for use to protect the aluminum component from surface melting by the laser pulse, which adversely affects fatigue life. This paper, using nano-indentation, analyzes the effect of the paint and foil coatings on the shock wave propagation into the aluminum specimen and the resulting change in mechanical properties versus depth Near the surface, hardness was found to be increased by the laser peening, however this process decreased the measured elastic modulus. The laser pulse energy density and properties of the foil including its adhesion to the aluminum alloy were found to influence the change in surface mechanical properties.

In the process of laser peening, a high power laser is made incident onto a metal surface, ablating a thin surface layer, creating a plasma and a consequent intense shock. This intense shock plastically strains the material and results in a compressive layer of residual stress in the surface. To avoid contact of the hot plasma with the metal surface, a layer or layers of material are applied to the substrate surface to act as a source of ablation material and to provide insulation from the plasma's heat. This plasma is the source of a shock wave that forms and consequently peens the material. Originally paint was used as the ablation layer but paint does not have sufficient tensile strength to keep from locally shearing when the shock locally compresses the surface. It also fractures and debonds when the shock ends and the surface rebounds. Tapes with adhesive backing have proved to be a better ablation material. They are readily applied, stick to the surface and have sufficient tensile strength to allow continuous side-by-side peening without in general shearing or debonding. However it has been realized that in applying the tape to surfaces, small pockets of air, often as small as 20 µm in semi-spherical size can be trapped under the tape and in contact with the metal surface. When these pockets are compressed by the shock wave they heat in an adiabatic manner and transmit this heat to the metal. For metals that melt at low temperature, such as aluminum, this transmitted heat can be sufficient to locally melt the metal and create a small pit of molten material that subsequently solidifies as a solid crater. This pit is undesirable as it solidifies in a tensile state forming a stress riser on the metal surface and potentially reduces the fatigue lifetime and resistance to corrosion of the peened sample.

SUMMARY OF THE INVENTION

It is an object of the present invention to provide a method for laser peening that prevents the peening process from creating pits in the material to be peened.

It is another object of the invention to provide hybrid ablation layers for application onto a material to be laser peened to prevent the peened material from sustaining pits.

These and other objects will be apparent to those skilled in the art based on this disclosure.

To prevent pitting resulting from laser peening, a hybrid ablation layer that comprises a separate under layer is applied to a material to be peened. The underlayer is in contact with the surface to be peened and is applied in a manner such that it does not have bubbles and voids that exceed an acceptable size. One or more over layers such as metal foil or tape are applied over the under layer. The under layer can, for example, be a sprayed on adhesive or a paint layer that goes down without bubbles. Subsequently any bubbles formed under the over layers are insulated from the surface to be peened. The process has been tested and significantly reduces the incidence of pits on peened surfaces. The invention is useful in a variety of laser peening applications, such as laser peening of metals, laser peenforming of metals and laser peenmarking of metals.

BRIEF DESCRIPTION OF THE DRAWINGS

The accompanying drawing, which is incorporated into and forms part of this disclosure, illustrates an embodiment of the invention and together with the description, serves to explain the principles of the invention.

FIG. 1 shows a material with a surface that has been prepared according to the present invention.

DETAILED DESCRIPTION OF THE INVENTION

A hybrid ablation layer that comprises two or more layers is applied to a surface to be laser peened. The hybride ablation layer is formed of an underlayer and one or more overlayers. Referring to FIG. 1, the under layer 10 must be one that can be applied so that the maximum size of bubbles or voids does not exceed a defined amount as discussed below. This underlayer is applied in contact with a surface 12 to be peened and then one or more over layers 14 such as metal foil or tape are applied that provide the needed tensile strength. In one embodiment of the invention, the underlayer contains no voids or bubbles larger than 10 microns in diameter. Aluminum tape that is about 3 mils thick and has about 1 mil of adhesive is applied in one embodiment. Two layers of tape may be used. The under layer can for example be sprayed on adhesive or a paint layer that goes down without bubbles due to the nature of spraying. The paint may be about 4 to 5 mils thick. Another approach is to dip coat the underlayer and allow it to cure or, e.g., to cure it by applying appropriate heat in an oven or with heat lamps. Paint needs to be of the type that will bond well to the surface. Such paint material can include high quality metal primers and thermally cured expoxies. Spray on adhesives, such as that produced by 3M corporation, (3M Metal Primer EC3901, 3M Structural Adhesive Primer EC-1593 or EC-1660) can be made to uniformly cover the surface and allow the tape without adhesive to be applied on top. With the underlay sprayed on and thus applied without bubbles, the top layer or layers of foil can next be applied. Typically in applying solid layers of tape to a surface, air bubbles will be trapped under the surface. It is nearly impossible to remove them by vacuum pumping because they are trapped. However with the under layer applied without bubbles, any bubbles formed between the under layer and the over layers are insulated from the surface to be peened. When these bubbles compress due to the shock compression, the heat generated within them would be dissipated in the under layer and thus would not come in contact with or melt or pit the metal to be peened. The process has been tested and significantly reduces the incidence of pits on peened surfaces.

The potential of an air bubble trapped under tape to create pits in laser peening can be calculated. To see whether an air bubble has enough heat capacity and temperature rise to melt a small pit underneath the tape in a laser peening process, a calculation is made of the heat capacity and temperature rise of a 1 mm diameter hemispherical bubble, and the heat energy required to melt a reasonable sized pit and the potential for this heat transfer to occur are evaluated.

Using, as an example, the volume, mass and kenetic energy in a 1 mm diameter hemispherical bubble, the following calcuations are provided. The volume of a 1 mm bubble is $V=2/3\pi r^3 = 2.6 \times 10^{-10}$ m$^3$. Starting with $PV=nRT$, we can calculate how many kmoles of gas and how much mass is in the bubble at the room condition starting point of standard temperature and pressure (STP). At STP, $P=1$ atmosphere$=10^5$ N/m$^2$ and $T=300$ K. R is the universal gas constant of value 8314.4 J/kmol*K deg. $n=PV/RT=(10^5*2.6\times10^{-10})/(831*300)=1\times10^{-10}$ kmol. Since air has a mass of roughly 28 kg/kmol this bubble has a mass of $2.8\times10-9$ kg. The kinetic energy of the molecules in the bubble is approximately $E=n(5/2)RT=17$ mJ.

The temperature rise of the bubble during laser shock compression is calculated. When the shock wave from the laser peening process impacts the tape and bubble, the pressure increases from 1 atmosphere to $10^5$ atmospheres. The gas rises in a nearly adiabatic manner to a temperature of $T/To=(p/po)^{(\gamma-1)/\gamma}$. In this equation, $\gamma$ is the ratio of specific heat at constant volume to the specific heat at constant pressure. For a diatomic gas such as air $\gamma$ is approximately 5/3. Consider melting a small volume of aluminum. Thus for a sudden pressure increase by a factor of $10^5$ as created by the laser, the temperature could potentially increase to $T=300(10^5)^{2/5}=30,000$. The temperature will almost surely not rise this high due to other mitigating effects such as Rayleigh Tayor instabilities limiting the compression and limited diffusion rates from the gas into the metal. However a significant temperature rise above the aluminum melting point of 650 C is anticipated.

To determine how much heat energy is required to melt a pit, the following calculation is made. If a small pit is 20 microns in diameter and 5 microns deep, then the volume and mass of melted aluminum is $V=(d*\pi*diameter^2)/4=(5\times10^{-6}*p*(20\times10^{-6})^2)/2=1.6\times10^{-5}$ m$^3$. m=2700 kg/m3*$1.6\times10^{-15}$ m$^3$=$4\times10^{-12}$ kg. The amount of heat required to melt this aluminum is that required for the temperature of the material to rise to the melting point of 650 C plus the heat of fusion to take the metal from solid to liquid state. Taking the heat capacity of aluminum as $C=0.212$ kcal/kg-C., we calculate the heat required to raise the temperature by 650 C as follows: $Q(\Delta T)=m*C*\Delta T=4\times10^{-12}$ kg*0.212 kcal/K deg*650 K deg=$5\times10^{-10}$ kcal=$2.2\times10^{-6}$ J. Q(heat of fusion)=93 kcal/kg*$4\times10^{-12}$ kg*1 J/$2.4\times10^{-4}$ kcal=$1.5\times10^6$ J. Thus the total heat required is 3.7 μJ which is much less than the available 17 mJ available in the kinetic energy of the gas. Thus there is plenty of heat available in the gas to melt pit.

The heat diffused into the aluminum during the laser pulse is determined. The diffusivity of a material, that is the rate at which heat can diffuse into it, is given by the ratio of the thermal conductivity k and the product of the density, ρ and specific heat capacity, Cp. For aluminum these values are k=0.048 kcal/s*m*C deg, ρ=2700 kg/m$^3$ and Cp=0.212 kcal/kg*C deg.

$$D=k/(\rho*Cp)=8.2\times10^{-5} \text{ m}^2/\text{s}.$$

Since the diffusion is a random walk problem, the heat diffuses as the square root of the product of the diffusivity and the t=100 ns shock pulse duration.

Diffusion depth=2*Square Root (Dt)=2*Sqrt($8.4\times10^{-12}$)=6 microns. This diffusion length roughly matches the depth of observed pits.

From this simple analysis one can conclude that there is sufficient energy in the gas in a small bubble to melt pits and that the gas does undergo reasonable temperature rise during the period of the shock pressure increase.

There are other effects that can concentrate the energy of the shock wave into a local area and increase the temperature or the pressure and extrude liquid flow. A bubble under the surface is a low density region and refracts and tends to focus the shock wave such as an optical lens would. This increased shock intensity could induce melting. The protective layer applied without bubbles on top of the metal would diffuse the focusing intensity of the shock wave and reduce the potential to create a shock induced pit The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. A laser peening method, comprising,
    providing a workpiece;
    adhering an opaque first layer of paint onto said workpiece, wherein said first layer contains no voids or bubbles larger than 10 microns in diameter, wherein the step of adhering an opaque first layer comprises an adhering step selected from the group consisting of dip coating and spraying;
    adhering an opaque second layer onto said first layer; and
    propagating a pulse of laser light onto said second layer, wherein said pulse comprises sufficient energy density to ablate a portion of said second layer, thereby ejecting a plasma, wherein said plasma produces a shock wave that propagates onto said first layer and onto said workpiece, thereby peening said workpiece, wherein said opaque first layer and said opaque second layer are opaque to the wavelength of said pulse of laser light.

2. The method of claim 1, wherein said second layer comprises a plurality of layers.

3. The method of claim 1, wherein said second layer comprises metal foil.

4. The method of claim 3, wherein said metal foil comprises adhesive.

5. The method of claim 1, wherein said second layer comprises tape.

6. The method of claim 5, wherein said tape comprises adhesive.

7. The method of claim 5, wherein said tape comprises metal tape.

8. The method of claim 7, wherein said metal tape comprises aluminum tape.

9. The method of claim 1, wherein said first layer comprises sprayed on paint.

10. The method of claim 1, wherein said first layer comprises a dip applied paint.

11. The method of claim 1, wherein said first layer comprises metal primer.

12. An apparatus, comprising,
an opaque first layer of paint adhered to a workpiece to be laser peened, wherein said first layer contains no voids or bubbles larger than 10 microns in diameter, wherein said first layer is adhered to said workpiece by dip coating or spraying;
an opaque second layer adhered to said first layer; and
means for propagating a pulse of laser light onto said second layer wherein said pulse comprises sufficient energy density to ablate a portion of said second layer, thereby ejecting a plasma, wherein said plasma produces a shock wave that propagates onto said first layer and onto said workpiece, thereby peening said workpiece, wherein said opaque first layer and said opaque second layer are opaque to the wavelength of said pulse of laser light.

13. The apparatus of claim 12, wherein said second layer comprises a plurality of layers.

14. The apparatus of claim 12, wherein said second layer comprises metal foil.

15. The apparatus of claim 14, wherein said metal foil comprises adhesive.

16. The apparatus of claim 12, wherein said second layer comprises tape.

17. The apparatus of claim 16, wherein said tape comprises adhesive.

18. The apparatus of claim 16, wherein said tape comprises metal tape.

19. The apparatus of claim 18, wherein said metal tape comprises aluminum tape.

20. The apparatus of claim 12, wherein said first layer comprises sprayed on paint.

21. The apparatus of claim 12, wherein said first layer comprises a dip applied paint.

22. The apparatus of claim 12, wherein said first layer comprises metal primer.

* * * * *